US012581481B2

(12) United States Patent
Andersson et al.

(10) Patent No.: US 12,581,481 B2
(45) Date of Patent: Mar. 17, 2026

(54) SYSTEMS AND METHODS OF MONITORING UL CANCELATION INDICATIONS

(71) Applicant: Telefonaktiebolaget LM Ericsson (PUBL), Stockholm (SE)

(72) Inventors: Mattias Andersson, Sundbyberg (SE); Ali Behravan, Stockholm (SE); Kittipong Kittichokechai, Järfälla (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 536 days.

(21) Appl. No.: 17/766,781

(22) PCT Filed: Oct. 6, 2020

(86) PCT No.: PCT/IB2020/059390
§ 371 (c)(1),
(2) Date: Apr. 6, 2022

(87) PCT Pub. No.: WO2021/070064
PCT Pub. Date: Apr. 15, 2021

(65) Prior Publication Data
US 2024/0064730 A1     Feb. 22, 2024

Related U.S. Application Data

(60) Provisional application No. 62/911,913, filed on Oct. 7, 2019.

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC .......................... H04W 72/23; H04W 52/0216
See application file for complete search history.

(56) References Cited

U.S. PATENT DOCUMENTS

| | | | |
|---|---|---|---|
| 2021/0022134 A1* | 1/2021 | Chen ................. | H04W 72/0446 |
| 2021/0168848 A1* | 6/2021 | Chatterjee ............... | H04W 8/24 |
| 2022/0159701 A1* | 5/2022 | Islam .................... | H04L 1/1812 |

OTHER PUBLICATIONS

3GPP TS 38.213 v15.7.0; Technical Specification; 3rd Generation Partnership Project; Technical Specification Group Radio Access Network; NR; Physical layer procedures for control (Release 15)—Sep. 2019.

(Continued)

*Primary Examiner* — Sulaiman Nooristany
(74) *Attorney, Agent, or Firm* — Baker Botts L.L.P.

(57) ABSTRACT

Systems and methods of monitoring uplink (UL) cancelation indications are provided. In some embodiments, a method performed by a wireless device for monitoring UL cancelation indications includes: determining (800, 900) a time interval during which the wireless device should monitor UL cancelation indications; and monitoring (802) UL cancelation indications during the time interval. Some embodiments provide a time interval during which the wireless device needs (902) to monitor UL cancelation indication such that it avoids unnecessary monitoring. This may result in savings in wireless device power consumption.

15 Claims, 15 Drawing Sheets

(56)             References Cited

OTHER PUBLICATIONS

3GPP TS 38.214 v15.6.0; Technical Specification; 3rd Generation Partnership Project; Technical Specification Group Radio Access Network; NR; Physical layer procedures for data (Release 15)—Jun. 2019.

3GPP TSG RAN WG1 Meeting #98bis; Chongqing, China; Source: CATT; Title: Discussion on inter-UE UL multiplexing (R1-1910345)—Oct. 14-20, 2019.

3GPP TSG RAN WG1 #98bis; Chongqing, China; Source: OPPO; Title: Inter UE Tx prioritization and multiplexing (R1-1910623)—Oct. 14-20, 2019.

PCT International Serach Report and Written Opinion of the International Searching Authority issued for International application No. PCT/IB2020/059390—Dec. 2, 2020.

* cited by examiner

SYSTEMS AND METHODS OF MONITORING UL CANCELATION INDICATIONS

PRIORITY

This nonprovisional application is a U.S. National Stage Filing under 35 U.S.C. § 371 of International Patent Application Serial No. PCT/IB2020/059390 filed Oct. 6, 2020 and entitled "SYSTEMS AND METHODS OF MONITORING UL CANCELATION INDICATIONS" which claims priority to U.S. Provisional Patent Application No. 62/911,913 filed Oct. 7, 2019 both of which are hereby incorporated by reference in their entirety.

TECHNICAL FIELD

The present disclosure relates to uplink cancelation of scheduled resources in telecommunications networks.

BACKGROUND

Ultra-Reliable and Low Latency Communication (URLLC) is one of the main use cases of Fifth Generation (5G) New Radio (NR). URLLC has strict requirements on transmission reliability and latency, i.e., up to 99.9999% reliability and 1 ms one-way latency. In NR Rel-15, several new features and enhancements were introduced to support these requirements. In Rel-16, standardization works are focused on further enhancing URLLC system performance as well as ensuring reliable and efficient coexistence of URLLC and other NR use cases. One example scenario is when both Enhanced Mobile Broadband (eMBB) and URLLC User Equipments (UEs) co-exist in the same cell. Here, two main approaches have been identified to support multiplexing/prioritization.

The first method is based on power control to increase the power of the URLLC to make it more resilient to interference from the eMBB user(s). Power control for Release 15 UEs is specified in 3GPP TS 38.213, 7.1.1. The main advantage with this option is that it does not require any changes in the behavior of the eMBB UE, hence it works with Release 15 UEs. One disadvantage is that to guarantee the performance of the URLLC UE while being interfered by eMBB traffic, its transmit Power Spectral Density (PSD) may have to be increased significantly. But for example UEs not in the close vicinity of the base station may not have the power budget to do this increase and will therefore experience much lower Signal to Interference ad Noise Ratio (SINR) than the required.

The second method is based on a preemption indication being transmitted from the base station to the interfering eMBB UEs. When a URLLC UE is scheduled on time/frequency resources that are already scheduled to a lower priority eMBB UE, the base station can transmit a preemption indication to the eMBB UE. Upon reception of this indication, the eMBB UE will avoid transmitting on a set of preconfigured resources. The details of the preemption indication and the UE behavior upon reception of this signal are currently being discussed in 3GPP. This indication can point to one or more Orthogonal Frequency Division Multiplexing (OFDM) symbols, or to a set of resource elements. In some versions, there are several possible sets of OFDM symbols or sets of resource elements, and the indication points to one or more of these sets.

A typical use case for this is when eMBB traffic is scheduled in a whole slot, and all PRBs and time sensitive URLLCs need to be transmitted. Here, time sensitive means that it requires instant access to the channel, and waiting until the next available resources will introduce too much delay. In NR URLLC, traffic may be scheduled on one or a few OFDM symbols and with a significantly shorter time from the uplink grant to when the uplink transmission takes place. This means that eMBB users may already have been scheduled on all available time/frequency resources. With the preemption indication, the New Radio Base Station (gNB) can preempt the eMBB traffic and hence reduce the interference to the URLLC UE.

Throughout the following description, the terms Preemption Indication (PI) (sometimes referred to as a preemption indicator), Cancelation Indication (CI), or UL preemption signal are sometimes used to refer to the same concept explained above.

Regarding how the UE cancels its UL transmission upon receiving the CI, two common cases are described below. These include partial cancelation and complete cancelation.

It might be difficult for a UE to change its transmission bandwidth during a transmission. Therefore, in some versions of cancelation indication, if a signal that can be canceled overlaps in time and frequency resources with the signaled resources that are to be canceled, the UE cancels transmissions on all of the OFDM symbols that are pointed to. Stopping a transmission and resuming it can lead to phase discontinuity of the signal. Therefore, in some versions the UE does not resume transmission even if the canceled signal occupies any resource elements in later OFDM symbols than the signaled set of resources. FIG. 1 (A) illustrates a partial cancelation where the UE only cancels OFDM symbols of the UL transmission overlapped with the signaled resource to be canceled. FIG. 1 (B) illustrates a complete cancelation where the whole UL transmission is canceled even if it is partially overlapped with the signaled resource to be canceled.

The UE may be configured to monitor the UL cancelation indication according to certain search space. However, to reduce the UE monitoring for UL CI, it has been proposed that UE may start monitoring the UL CI only after the UL grant is decoded or may monitor the UL CI at least on certain occasion. The agreement in RANI #98 is shown below.

Agreements:
The UE DCI size budget is not increased by UL CI monitoring
Further discuss methods to reduce the UE monitoring for UL CI, e.g.
The number of aggregation levels and/or candidates for the UL CI monitoring should be limited
Conditions for eMBB UE UL CI monitoring:
For UL transmission with associated PDCCH,
Option 1: UE starts UL CI monitoring after the PDCCH is decoded
Option 2: UE monitors UL CI at least at the latest monitoring occasion ending no later than X symbols before the start of the UL transmission, and X is related to UL CI processing time.
For UL transmission without an associated PDCCH, the UE monitors UL CI at least at the latest monitoring occasion that ends no later than X symbols before the start of the UL transmission, and X is related to UL CI processing time.

There currently exist certain challenge(s). Upon receiving the UL preemption/cancelation indication, a first UE stops the ongoing transmission to make resources available for a second UE to transmit UL data. The UE has to monitor for the cancelation indication at least after receiving its UL grant. However, there can be a long interval between when the UE receives the UL grant until the time it is scheduled for UL transmission as shown in FIG. 2. FIG. 2 illustrates possible monitoring occasions of UL cancelation indication at the UE. This can have impact on UE monitoring time, i.e., battery consumption, etc. As such, improved systems and methods for monitoring UL cancelation indications are needed.

SUMMARY

Systems and methods of monitoring uplink (UL) cancelation indications are provided. In some embodiments, a method performed by a wireless device for monitoring UL cancelation indications includes: determining a time interval during which the wireless device should monitor UL cancelation indications and monitoring UL cancelation indications during the time interval. Some embodiments provide a time interval during which the wireless device needs to monitor UL cancelation indication such that it avoids unnecessary monitoring. In some embodiments, this may result in several technical advantages such as savings in wireless device power consumption. Some embodiments include determining the time interval during which the wireless device should monitor UL cancelation indication based on one or more of the group consisting of: a wireless device processing time; and a configuration of UL cancelation indications. In some embodiments, the wireless device processing time is specified as a function of $N_2$, where $N_2$ is the time between the end of PDCCH scheduling PUSCH and the start of the scheduled PUSCH.

Certain aspects of the present disclosure and their embodiments may provide solutions to the aforementioned or other challenges. The present disclosure relates to methods for reducing the monitoring time for UL cancelation indication. More specifically the method includes determination of a start and end of the time interval during which the UE should monitor UL cancelation indication, based on the UE processing time and the configuration of UL cancelation.

There are, proposed herein, various embodiments which address one or more of the issues disclosed herein. In some embodiments, a method performed by a wireless device for monitoring UL cancelation indications includes one or more of: determining a time interval during which the wireless device should monitor UL cancelation indications; and monitoring UL cancelation indications during the time interval. In some embodiments, this provides a time interval during which the wireless device needs to monitor UL cancelation indications such that it avoids unnecessary monitoring and therefore saves in power consumption.

In some embodiments, a method performed by a base station for enabling monitoring of UL cancelation indications includes one or more of: determining a time interval during which a wireless device should monitor UL cancelation indications; sending, to the wireless device, an indication of the time interval during which a wireless device should monitor UL cancelation indications; and sending, to the wireless device, an UL cancelation indication. In some embodiments, this provides a time interval during which the wireless device needs to monitor UL cancelation indications such that it avoids unnecessary monitoring and therefore saves in power consumption.

In some embodiments, determining the time interval comprises determining the time interval during which the wireless device should monitor UL cancelation indication based on one or more of: a wireless device processing time; and a configuration of UL cancelation indications. In some embodiments, the wireless device processing time relates to a time which the wireless device needs to process the UL cancelation indication. In some embodiments, the time which the wireless device needs to process the UL cancelation indication comprises a time which the wireless device needs to decode the UL cancelation indication.

In some embodiments, the wireless device processing time is specified as a function of $N_2$, where $N_2$ is the time between the end of PDCCH scheduling PUSCH and the start of the scheduled PUSCH.

In some embodiments, the wireless device processing time is specified as a function of $N_1$, where $N_1$ is the time between the end of PDSCH and the start of the PUCCH carrying HARQ-ACK corresponding to the PDSCH. In some embodiments, the wireless device processing time is specified as a function of $N_1$ and $N_2$.

In some embodiments, the wireless device processing time depends on one or more of: a wireless device processing capability; and Subcarrier Spacing (SCS).

In some embodiments, the time interval during which the wireless device should monitor UL cancelation indication only includes the monitoring occasions where, after processing the UL cancelation indication, it is possible to perform the indicated UL cancelation. In some embodiments, the time interval during which the wireless device should monitor UL cancelation indication only includes the monitoring occasions where the gap between the end symbol of UL cancelation indication and the start of the UL transmission is larger than the wireless device processing time for UL cancelation indication. In some embodiments, the time interval during which the wireless device should monitor UL cancelation indication only includes the monitoring occasions where the gap between the end symbol of UL cancelation indication and the end of the UL transmission is larger than the wireless device processing time for UL cancelation indication.

In some embodiments, the configuration of UL cancelation indications relates to a configuration of possible resources to which the cancelation indication can be applied.

In some embodiments, the configuration of UL cancelation indications only points to one or a limited number of the configured resources to indicate to the wireless device the resources over which the wireless device should cancel its UL transmissions.

In some embodiments, the time interval during which the wireless device should monitor UL cancelation indications only includes one or more monitoring occasions where it is possible for the UL cancelation indication, according to the configuration, to indicate one or more resources which overlap with at least one UL transmission of the wireless device.

In some embodiments, the time interval during which the wireless device should monitor UL cancelation indications refers to a start of the UL cancelation monitoring.

In some embodiments, the time interval during which the wireless device should monitor UL cancelation indications refers to an end of the UL cancelation monitoring.

In some embodiments, the time interval during which the wireless device should monitor UL cancelation indication only includes the monitoring occasions which occur after the end symbol of PDCCH scheduling PUSCH for dynamically scheduled PUSCH.

In some embodiments, the time interval during which the wireless device should monitor UL cancelation indication only includes the monitoring occasions which occur after M symbols after the end symbol of PDCCH scheduling PUSCH, where M is a function of the wireless device processing time for PDCCH. In some embodiments, the wireless device processing time for PDCCH is specified as a function of $N_1$, where $N_1$ is a time between the end of PDSCH and the start of the PUCCH carrying HARQ-ACK corresponding to the PDSCH. In some embodiments, the wireless device processing time for PDCCH is specified as a function of $N_2$, where $N_2$ is a time between the end of PDCCH scheduling PUSCH and the start of the scheduled PUSCH. In some embodiments, the wireless device processing time for PDCCH is specified as a function of $N_1$ and $N_2$.

In some embodiments, the UL cancelation indication is for Ultra-Reliable and Low Latency Communication (URLLC).

Certain embodiments may provide one or more of the following technical advantage(s). Some embodiments of the current disclosure provide a time interval during which the UE needs to monitor UL cancelation indication such that it avoids unnecessary monitoring. In some embodiments, this may result in several technical advantages such as savings in UE power consumption.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
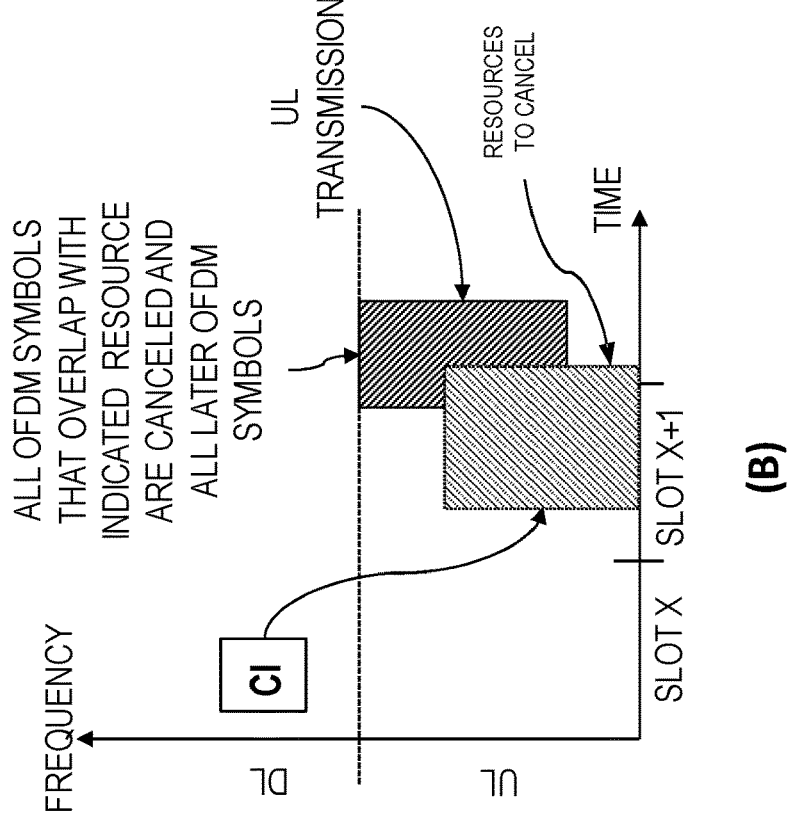
FIG. 1 illustrates a partial cancelation where the User Equipment (UE) only cancels Orthogonal Frequency-Division Multiplexing (OFDM) symbols of the Uplink (UL) transmission overlapped with the signaled resource to be canceled; and a complete cancelation where the whole UL transmission is canceled even if it is partially overlapped with the signaled resource to be canceled.
Figure 1:
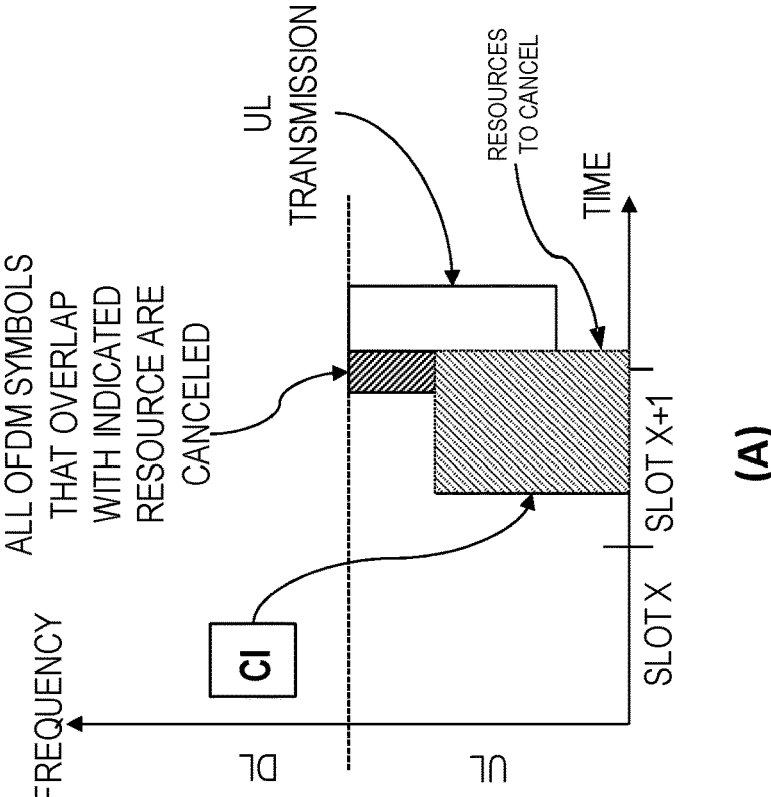
Figure 2:
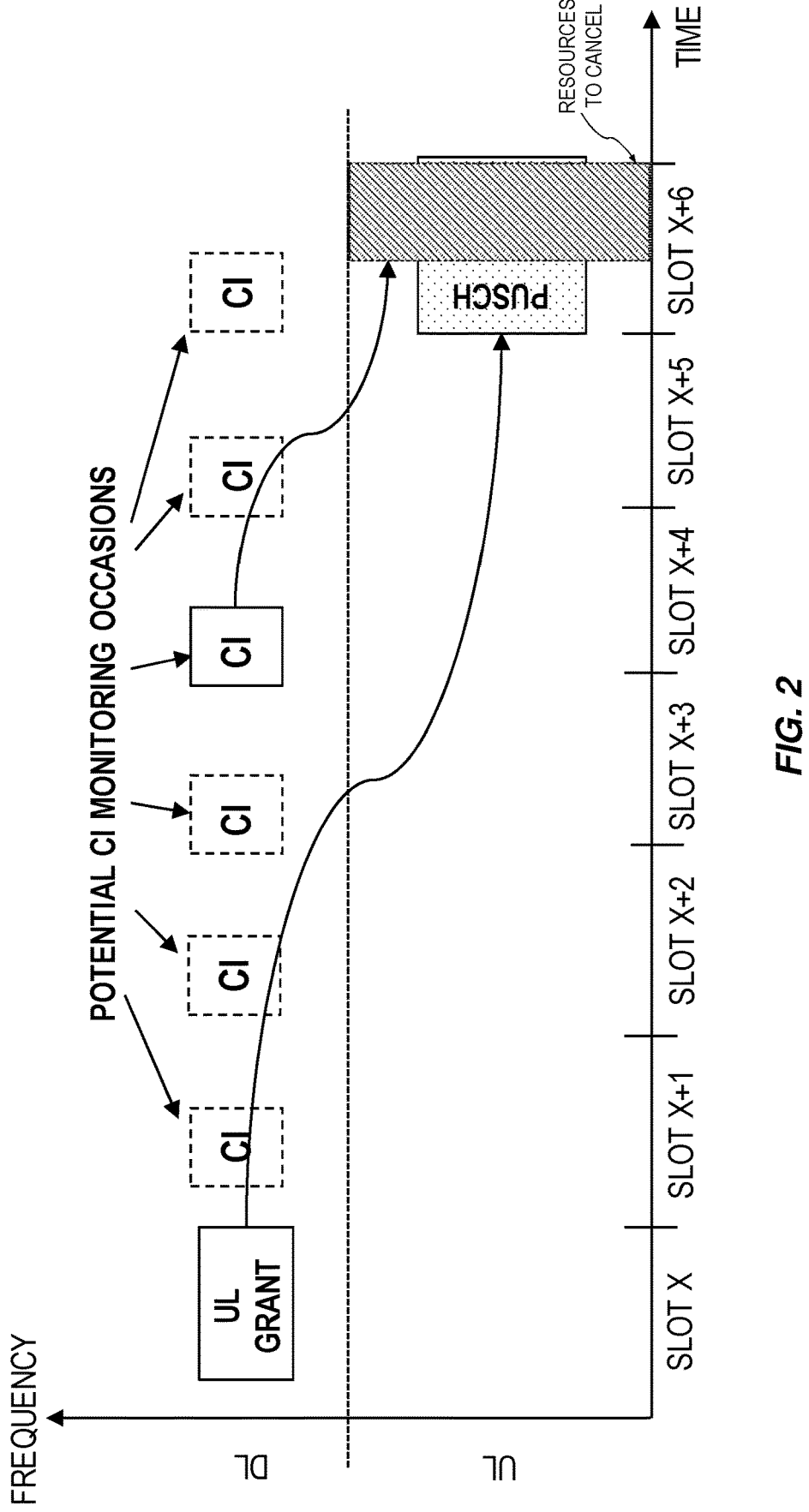
FIG. 2 illustrates possible monitoring occasions of UL cancelation indication at the UE.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
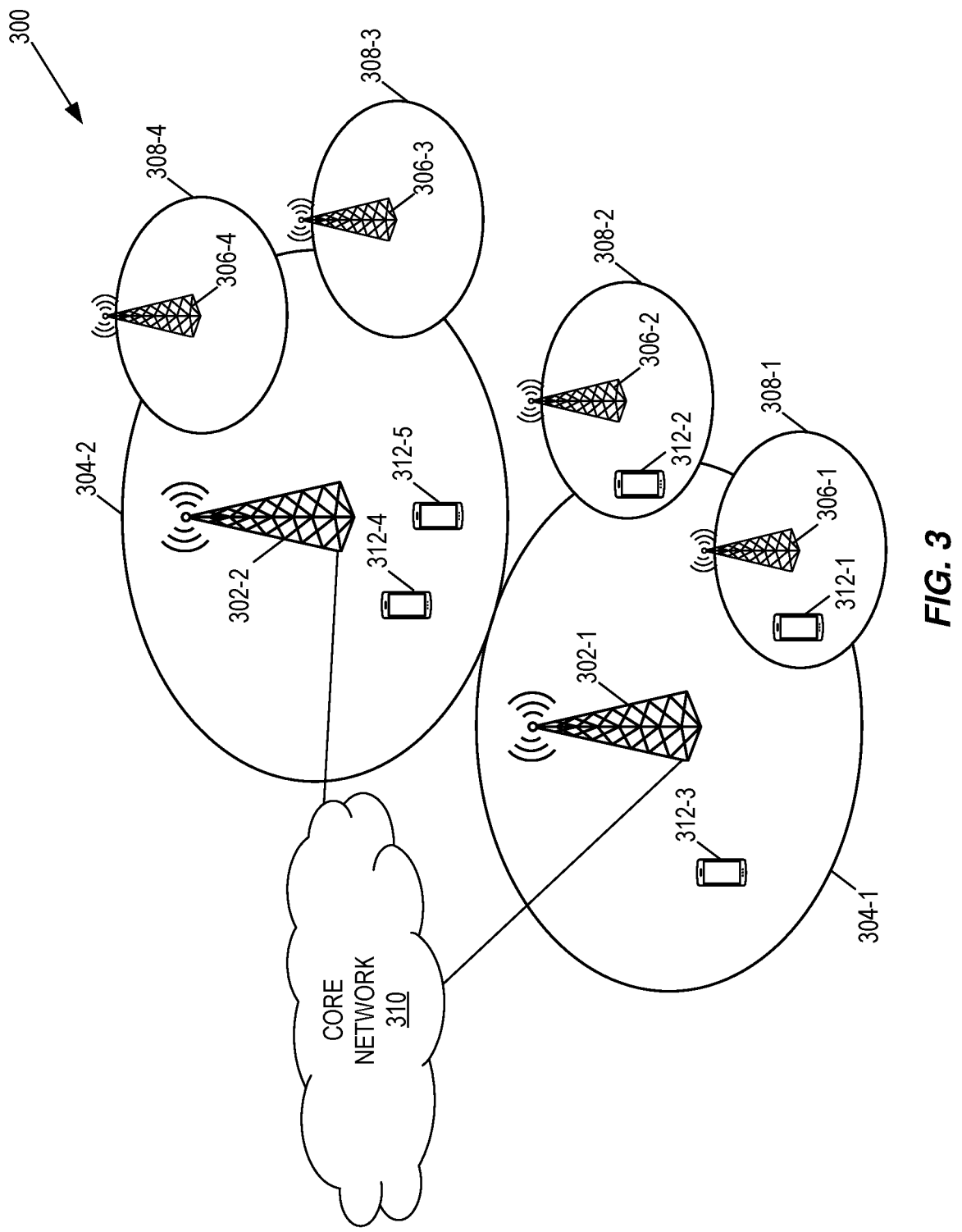
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including an NR Radio Access Network (RAN) or LTE RAN (i.e., Evolved Universal Terrestrial Radio Access (E-UTRA) RAN) or an Evolved Packet System (EPS) including a LTE RAN. In this example, the RAN includes base stations 302-1 and 302-2, which in LTE are referred to as eNBs (when connected to an Eveolved Packet Core (EPC)) and in 5G NR are referred to as gNBs (e.g., LTE RAN nodes connected to 5GC, which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

According to some embodiments of the current disclosure, the time interval during which the UE monitor UL is determined is based on UE processing time and the configuration of a UL cancelation indication.

The UE processing time may be related to the time which UE needs to process the UL cancelation indication, e.g., time to decode the UL cancelation indication.

Figure 4:
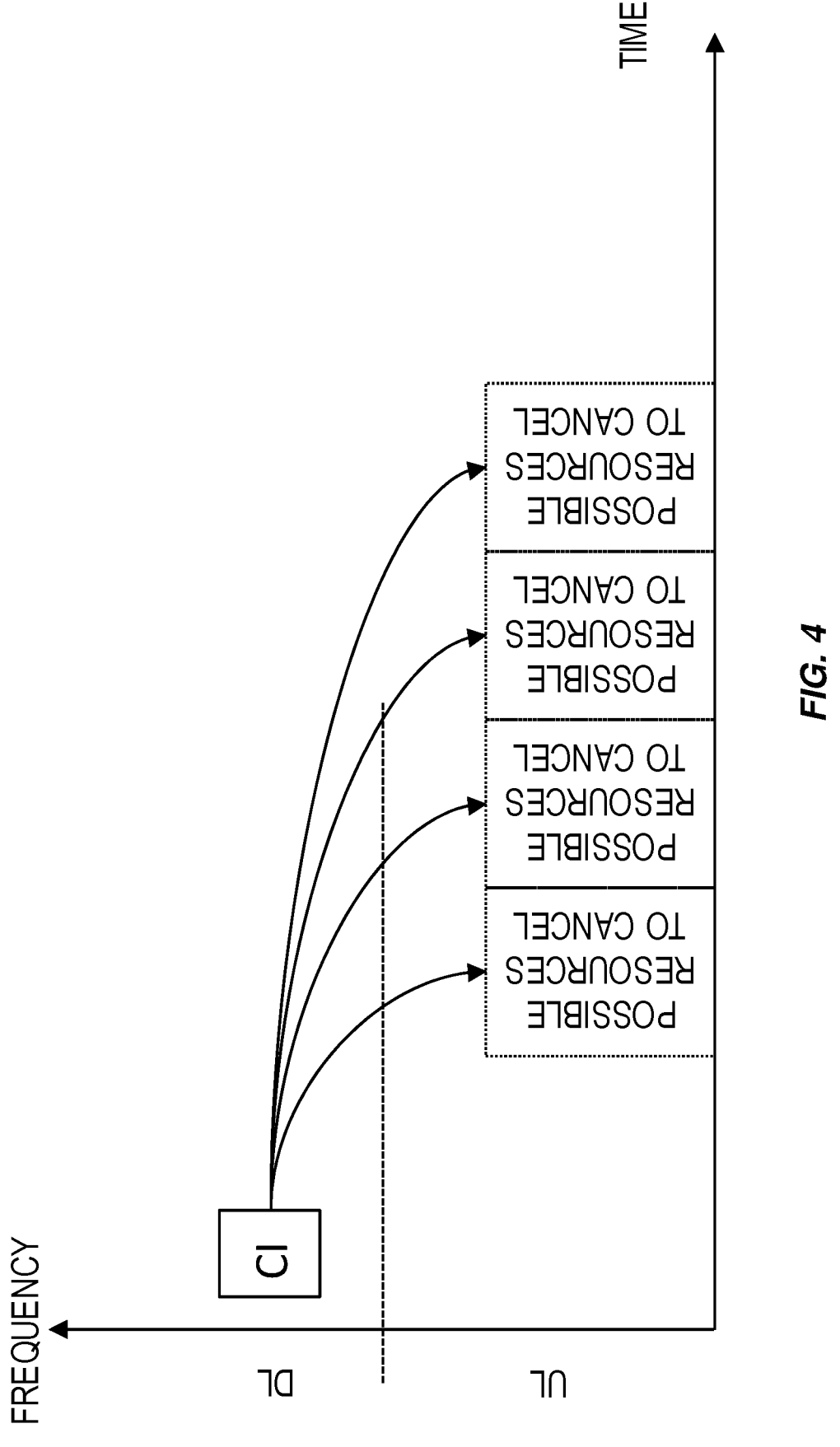
FIG. 4 illustrates a configuration of possible resources to which the UL cancelation indication can be applied, according to some embodiments of the present disclosure.

The configuration of the UL cancelation indication may be related to configuration of possible resources to which the cancelation indication can be applied. For example, in FIG. 4, four possible resources are configured for the UL cancelation. FIG. 4 illustrates a configuration of possible resources to which the UL cancelation indication can be applied, according to some embodiments. The arrows illustrate possible indications to different resources for the UE to cancel its UL transmission.

According to the configuration of UL cancelation indication, the UL cancelation indication may only point to one or a limited number of the configured resources to indicate to UE the resources over which the UE should cancel its UL transmissions.

In general, there can be multiple occasions that the UE should monitor for UL cancelation indications. However, not all occasions are relevant, as some of them may not be able to point to the resources overlapping with UL transmission of the UE.

Figure 5:
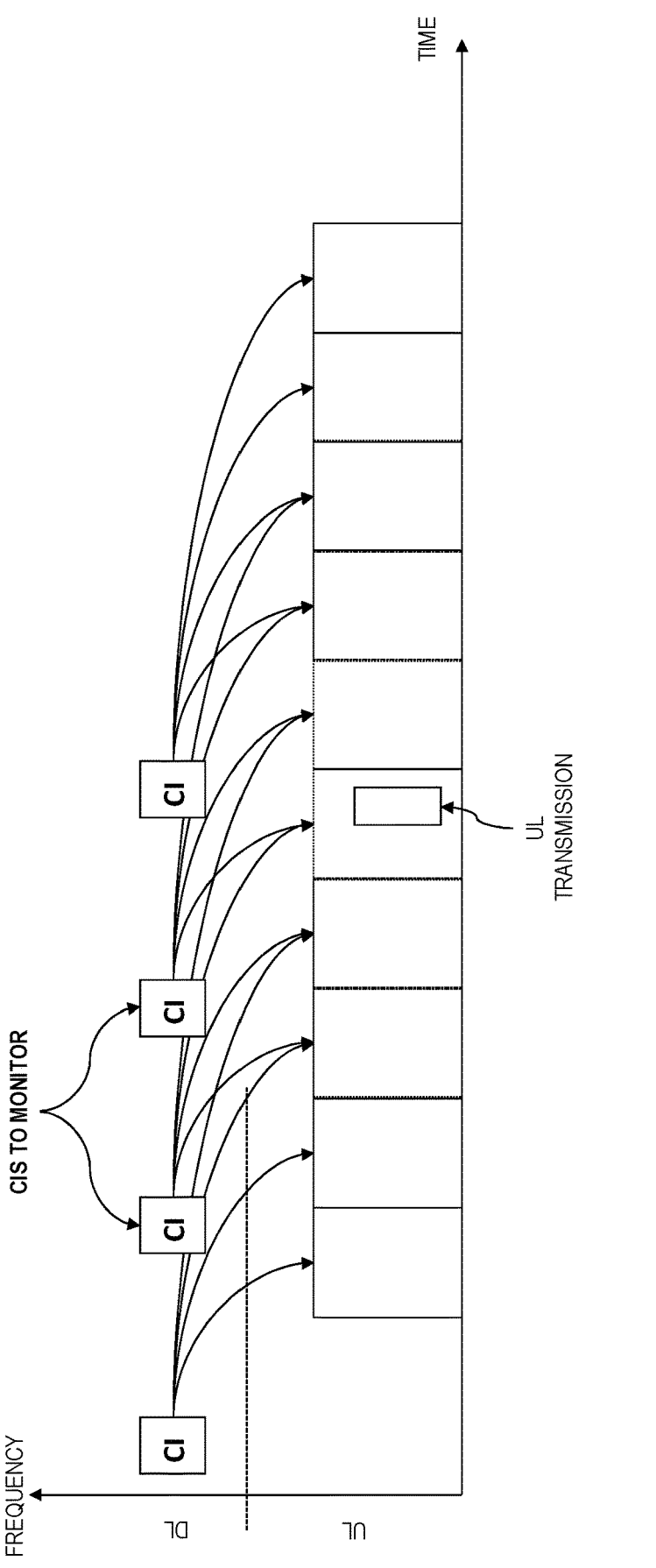
FIG. 5 illustrates multiple possible monitoring occasions of UL cancelation indications, according to some embodiments of the present disclosure.

For example, in FIG. 5, there are four possible monitoring occasions for UL cancelation indications. The CI corresponding to the first and fourth monitoring occasions can only point to resources, none of which overlap with the UL transmission. On the other hand, the second and third monitoring occasions may contain the CI, which points to the resource overlapping with the UL transmission. In this case, it is not necessary for the UE to monitor the first and fourth occasions, and only monitor the second and third occasions. FIG. 5 illustrates multiple possible monitoring occasions of UL cancelation indications, according to some embodiments of the current disclosure. Some of these occasions (first and fourth occasions) are not relevant for the UE to monitor as they cannot point to the resource overlapping with the UE's UL transmission.

In one non-limiting embodiment, the time interval during which the UE monitors UL cancelation indications only includes monitoring the occasions where it is possible for the UL cancelation indication, according to the configuration, to indicate the resources which overlap with at least one UL transmission of the UE.

In one version of the above embodiment, the time during which the UE monitors UL cancelation indications refers to the start of the UL cancelation monitoring.

In another version of the above embodiment, the time during which the UE monitors UL cancelation indications refers to the end of the UL cancelation monitoring.

Time Interval for Monitoring UL Cancelation Indication Based on the UE Processing Time of UL Cancelation Indication Typically, UE requires some time to process a UL cancelation indication before it can be applied to cancel any UL transmission. The UE processing time may be related to decoding time of UL cancelation at the UE.

In one version of the embodiment, UE processing time (in symbols) for the cancelation indication is specified as a function of N2 (e.g., time between the end of a Physical Downlink Control Channel (PDCCH) scheduling a Physical Uplink Shared Channel (PUSCH) and the start of the scheduled PUSCH) specified in Section 6.4 of TS38.214, V15.6.0.

In another version of the embodiment, the UE processing time (in symbols) for the cancelation indication is specified as a function of N1 (e.g., time between the end of the Physical Downlink Shared Channel (PDSCH) and the start of the Physical Uplink Control Channel (PUCCH) carrying a Hybrid Automatic Repeat Request Acknowledgement (HARQ-ACK) corresponding to the PDSCH) specified in Section 5.3 of TS38.214, V15.6.0.

Alternatively, UE processing time (in symbols) for the cancelation indication is specified as a function of both N1 and N2.

Note that since N1 and N2 depend on the UE processing capability and Subcarrier Spacing (SCS), the UE processing time for UL cancelation can also depend on the UE processing capability and SCS.

In one non-limiting embodiment, the time interval during which the UE monitors the UL cancelation indication only includes the monitoring occasions where after processing a UL cancelation indication, it is possible to perform UL cancelation.

In one version of the above embodiment, the time interval during which the UE monitors the UL cancelation indication only includes the monitoring occasions where the gap between the end symbol of UL cancelation indication and the start of the UL transmission is larger than the UE processing time for UL cancelation indication.

In another version of the above embodiment, the time interval during which the UE monitors the UL cancelation indication only includes monitoring the occasions where the gap between the end symbol of the UL cancelation indication and the end of the UL transmission is larger than the UE processing time for the UL cancelation indication.

Figure 6:
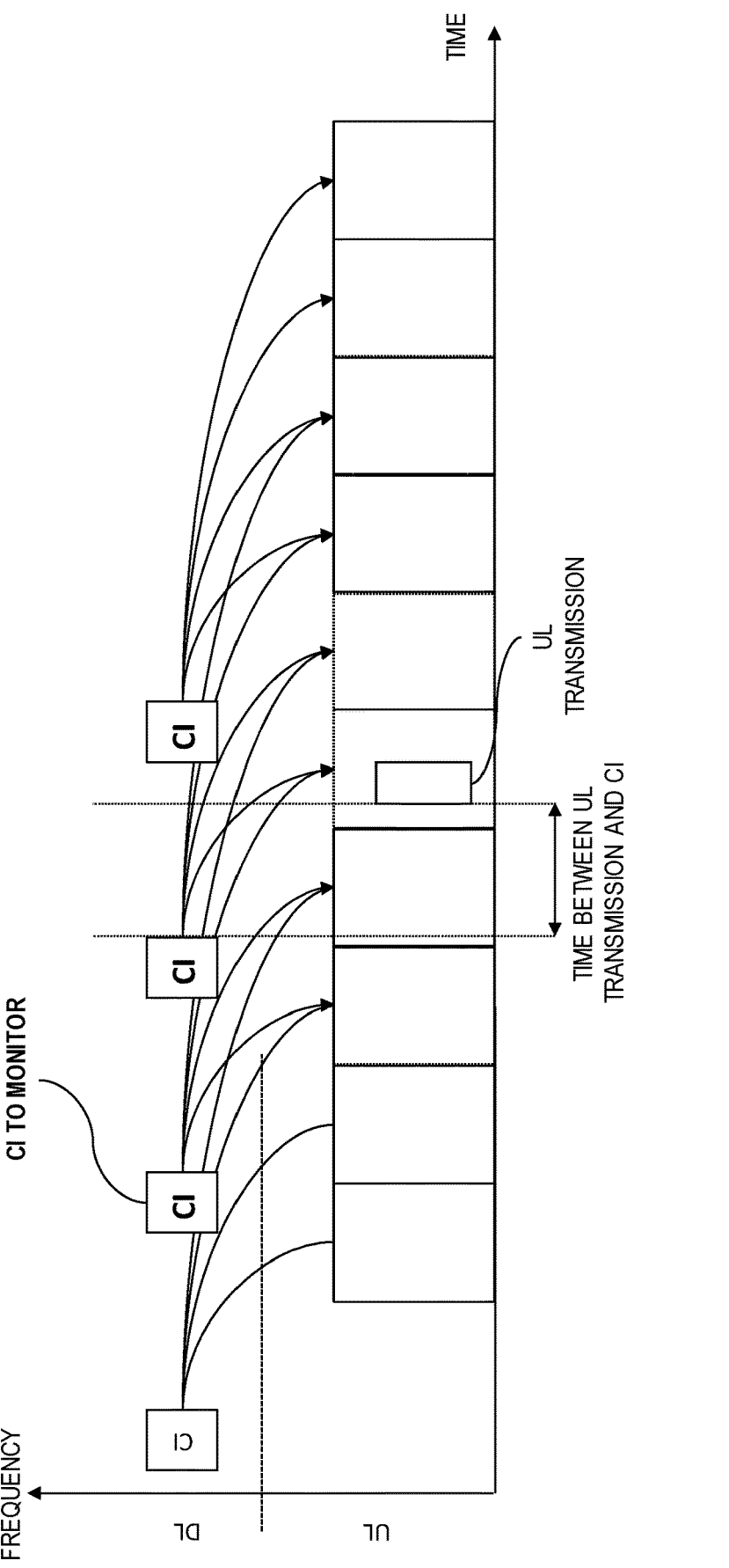
FIG. 6 illustrates multiple possible monitoring occasions of UL cancelation indications, according to some embodiments of the present disclosure.

For example, following up from FIG. 5 where UE only needs to monitor the second and third monitoring occasions of the cancelation indication, in FIG. 6, the UE processing time for UL cancelation indication is also taken into account. Assume that the time gap between the end of the third CI monitoring occasion and the start of the UL transmission is smaller than the specified UE processing time for UL cancelation indication. Therefore, UE does not have sufficient time to process the CI to be applied to the UL transmission. In this case, the UE can skip monitoring in the third occasion. FIG. 6 illustrates multiple possible monitoring occasions of a UL cancelation indication, according to some embodiments of the current disclosure. Some of these occasions (first and fourth occasions) are not relevant for the UE to monitor as they cannot point to the resource overlapping with the UE's UL transmission. In addition, the time gap between the end of the third occasion and the start of the UL transmission is shorter than the UE processing time for the UL cancelation indication. Thus, the third occasion is excluded from monitoring and only the second occasion is monitored.

Time Interval for Monitoring UL Cancelation Indication Based on the UE Processing Time of PDCCH Scenarios of inter-UE preemption described in the current disclosure where UL transmission can be canceled according to the UL cancelation indication may include different types of UL transmission, e.g., PUSCH, PUCCH, and Physical Random Access Channel (PRACH).

In case of a dynamically scheduled PUSCH, there exists a corresponding PDCCH with a UL grant.

If the dynamically scheduled PUSCH were to be canceled due to the UL CI, it is reasonable that the UL CI is received after the UL grant scheduling PUSCH. Otherwise, it is possible for gNB to avoid scheduling the PUSCH such that it conflicts with resource needed for any latency-critical UL transmission.

Since the UE requires some time to process the PDCCH before it can start preparing for the PUSCH, this processing time can be taken into account for monitoring of the UL cancelation indication.

In one non-limiting embodiment, the time interval during which the UE monitors UL cancelation indications to be applied to dynamically scheduled PUSCH only includes the monitoring occasions which occur after the end symbol of the PDCCH scheduling the PUSCH.

In one version of the above embodiment, the time interval during which the UE monitors the UL cancelation indication to be applied to the dynamically scheduled PUSCH only includes the monitoring occasions which occur after M symbols after the end symbol of the PDCCH scheduling the PUSCH, where M is a function of the UE processing time for the PDCCH.

In one embodiment, the UE processing time for PDCCH (in symbols) is specified as a function of N1 (e.g., time between the end of the PDSCH and the start of the PUCCH carrying HARQ-ACK corresponding to the PDSCH) specified in Section 5.3 of TS38.214, V15.6.0.

In another version of the above embodiment, the UE processing time for PDCCH (in symbols) is specified as a function of N2 (e.g., time between the end of PDCCH scheduling PUSCH and the start of the scheduled PUSCH) specified in Section 6.4 of TS38.214, V15.6.0.

In yet another version of the embodiment, UE processing time for the PDCCH (in symbols) is specified as a function of both N1 and N2.

Figure 7:
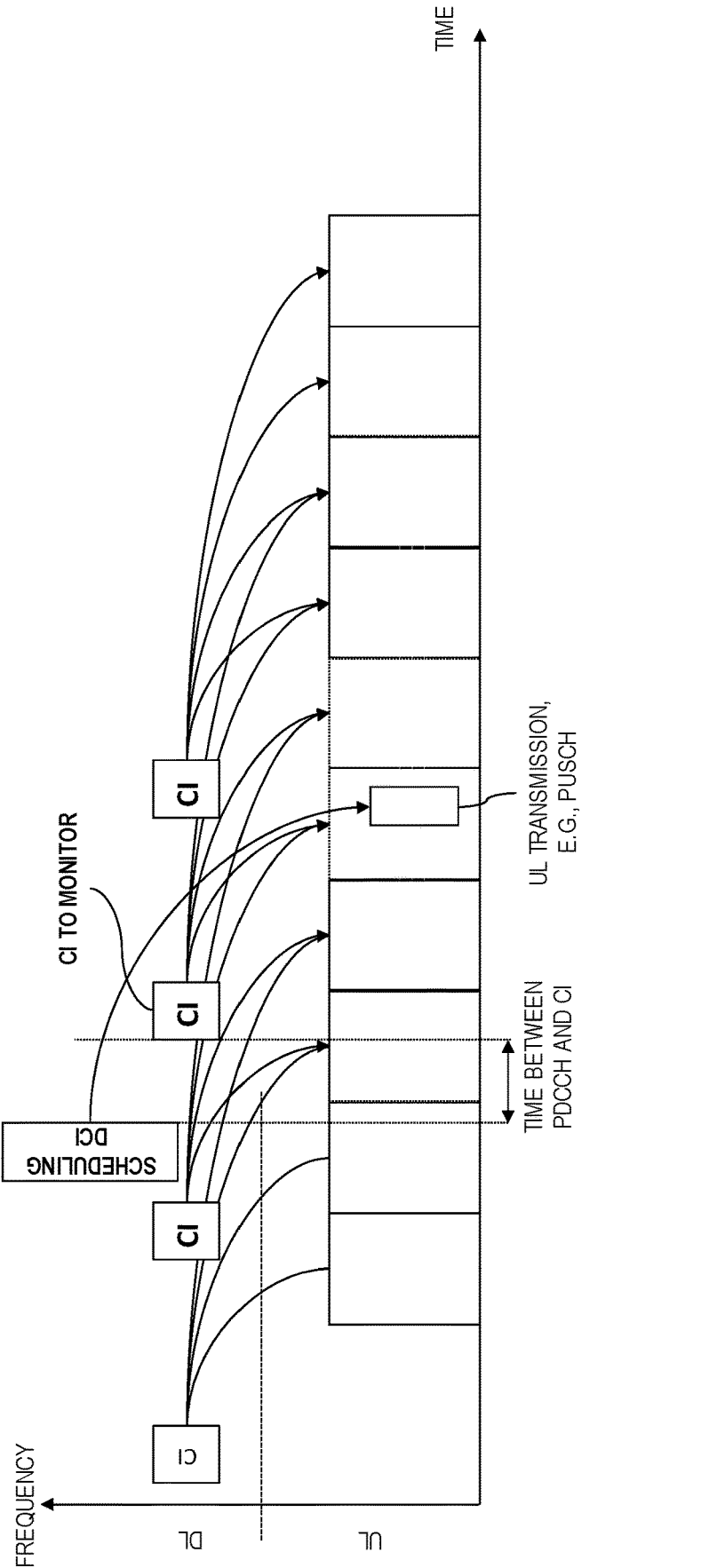
FIG. 7 illustrates multiple possible monitoring occasions of UL cancelation indications, according to some embodiments of the present disclosure.

For example, following up from FIG. 5 where UE only needs to monitor the second and third monitoring occasions of the cancelation indication, in FIG. 7, since UL transmission considered for cancelation is a dynamically scheduled PUSCH, the UE can consider monitoring only CI in the occasions after PDCCH containing Downlink Channel Information (DCI) scheduling the PUSCH. In this case, only the third monitoring occasion for CI is monitored by the UE. FIG. 7 illustrates multiple possible monitoring occasions of a UL cancelation indication, according to some embodiments of the current disclosure. Some of these occasions (first and fourth occasions) are not relevant for the UE to monitor as they cannot point to the resource overlapping with the UE's UL transmission. In addition, the UE only monitors CI for cancelation of the dynamically scheduled PUSCH after some M symbols after the end of the PDCCH, where M is defined as a function of UE PDCCH processing time. Assume that the time between the end of PDCCH and the third occasion for CI is larger than M. Therefore, the UE monitors only the third occasions for CI and skips the second occasion.

Time Interval for Monitoring UL Cancelation Indication Based on the all Previous Sections In one non-limiting embodiment, the time interval during which the UE monitors the UL cancelation indication is determined based on all above embodiments, e.g., determined based on the configuration of UL cancelation indication, UE processing time for the PDCCH, and UE processing time for the UL cancelation indication.

Figures 8, 9:
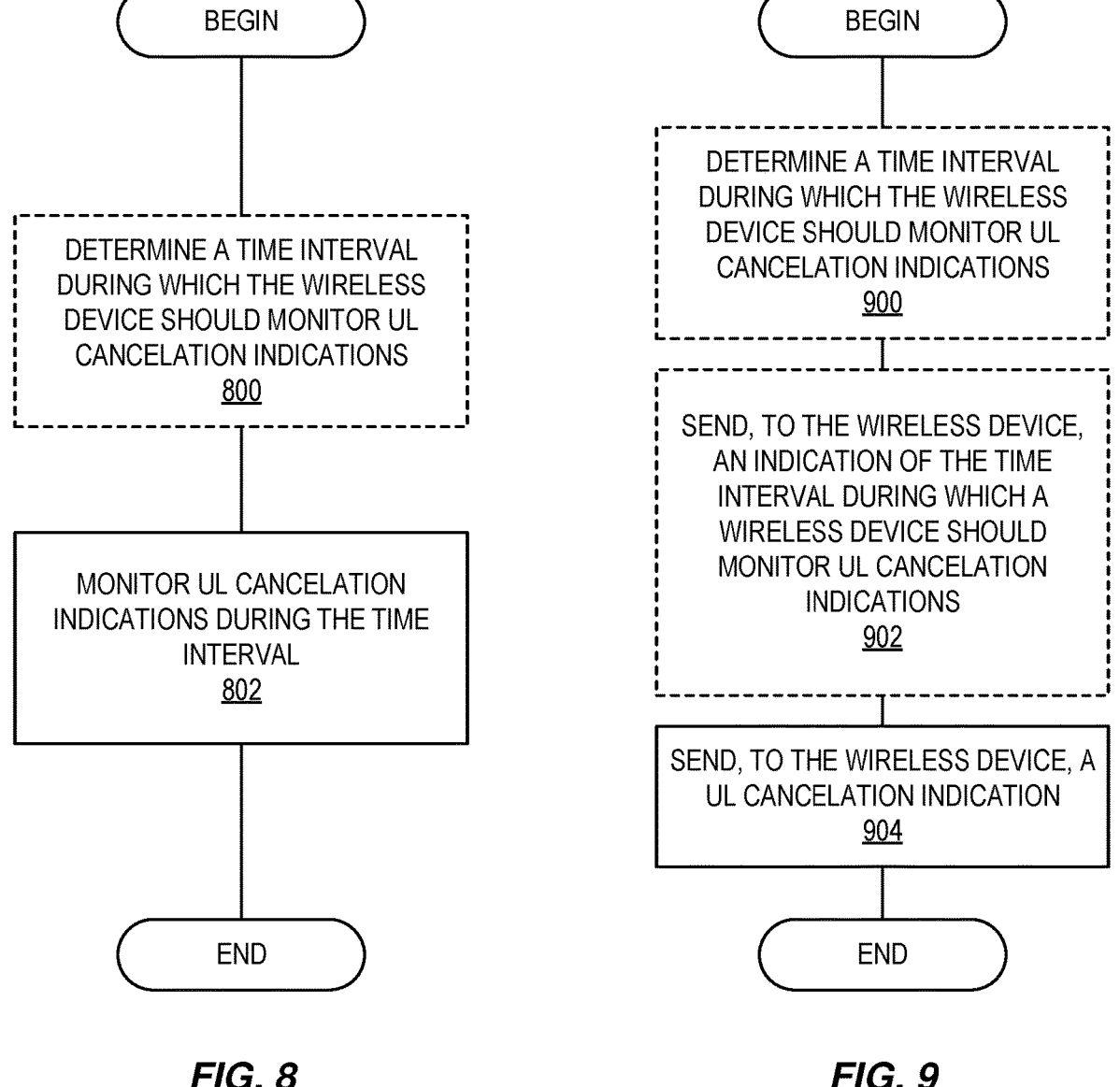
FIG. 8 illustrates a method performed by a wireless device for monitoring UL cancelation indications, according to some embodiments of the present disclosure.
FIG. 9 illustrates a method performed by a base station for enabling monitoring of UL cancelation indications, according to some embodiments of the present disclosure.

As discussed above, systems and methods for monitoring UL cancelation indications are provided. FIG. 8 illustrates an exemplary embodiment of the current disclosure. In some embodiments, a method performed by a wireless device for monitoring UL cancelation indications includes one or more of: determining a time interval during which the wireless device should monitor UL cancelation indications (step 800); and monitoring UL cancelation indications during the time interval (step 802). In some embodiments, this provides a time interval during which the wireless device needs to monitor UL cancelation indications such that it avoids unnecessary monitoring and therefore saves in power consumption.

FIG. 9 illustrates an exemplary embodiment of the current disclosure. In some embodiments, a method performed by a base station for enabling monitoring of UL cancelation indications includes one or more of: determining a time interval during which a wireless device should monitor UL cancelation indications (step 900); sending, to the wireless device, an indication of the time interval during which a wireless device should monitor UL cancelation indications (step 902); and sending, to the wireless device, a UL cancelation indication (step 904). In some embodiments, this provides a time interval during which the wireless device needs to monitor UL cancelation indications such that it avoids unnecessary monitoring and therefore saves in power consumption.

Figure 10:
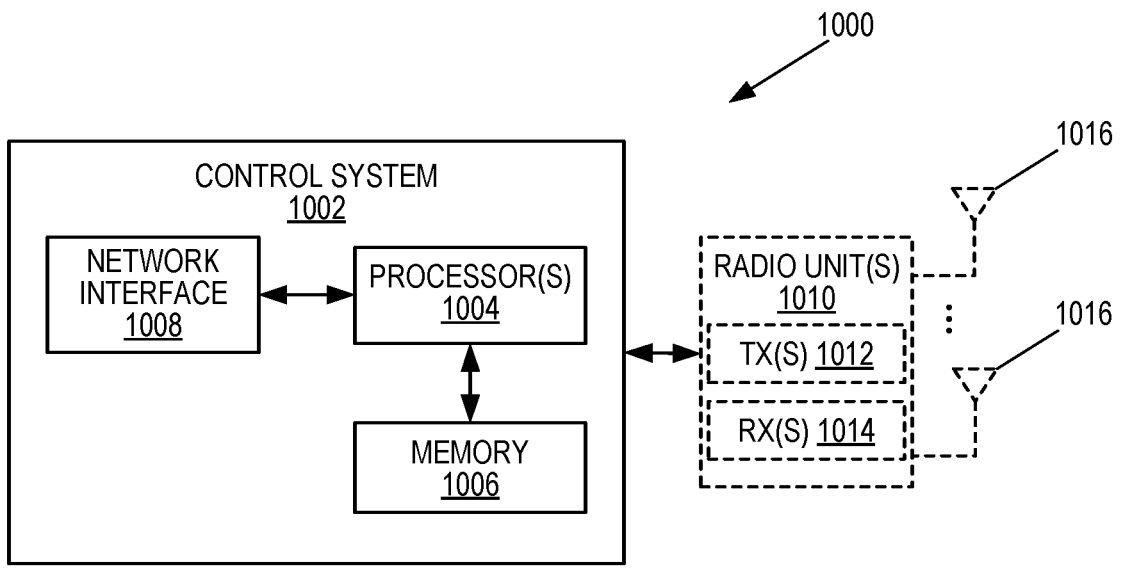
FIG. 10 is a schematic block diagram of a network node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 302 or 306 or a network node that implements all or part of the functionality of the base station 302 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
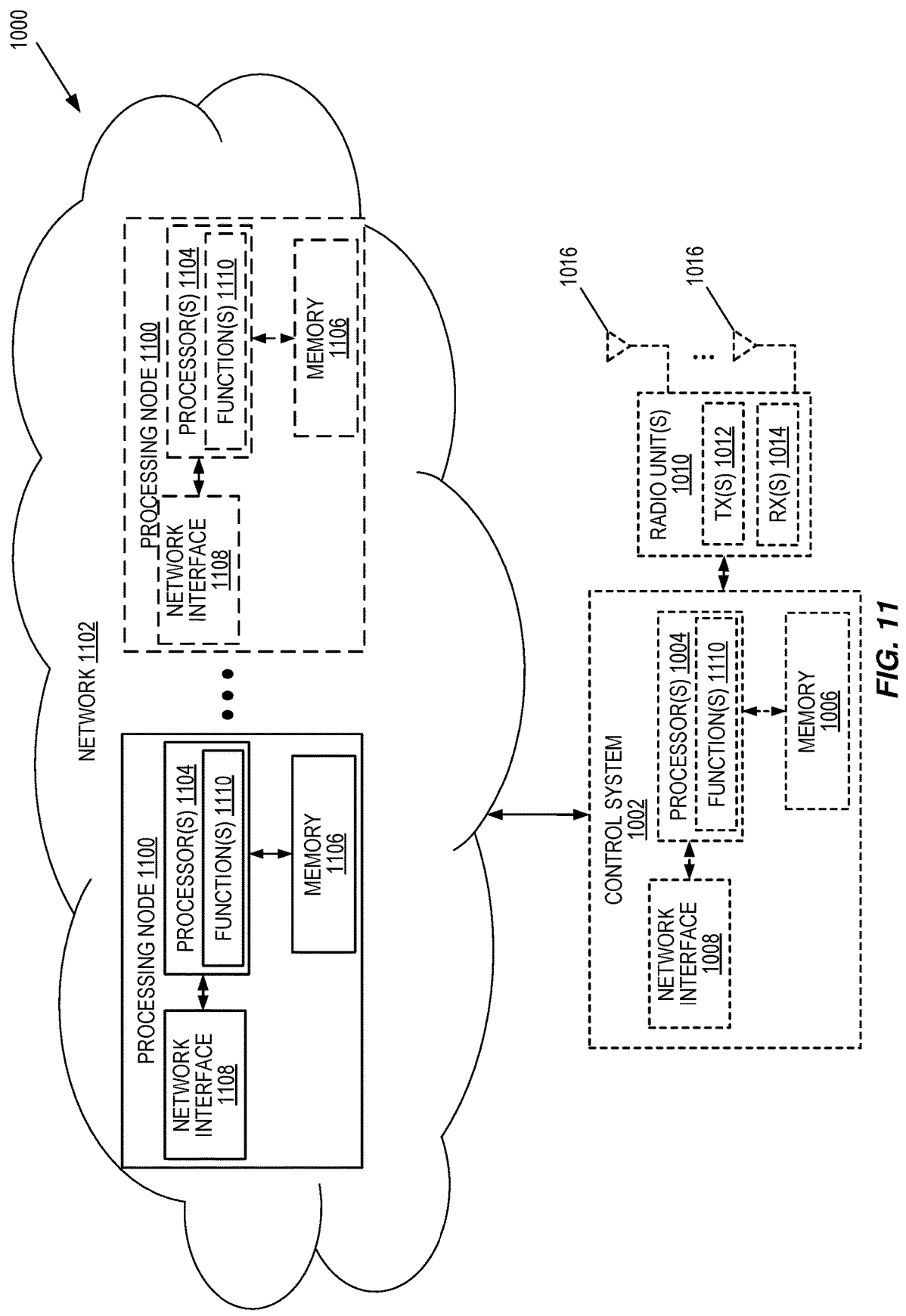
FIG. 11 is a schematic block diagram that illustrates a virtualized embodiment of the radio access node, according to some embodiments of the present disclosure.

FIG. 11 is a schematic block diagram that illustrates a virtualized embodiment of the radio access node 1000 according to some embodiments of the present disclosure.

This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAs, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
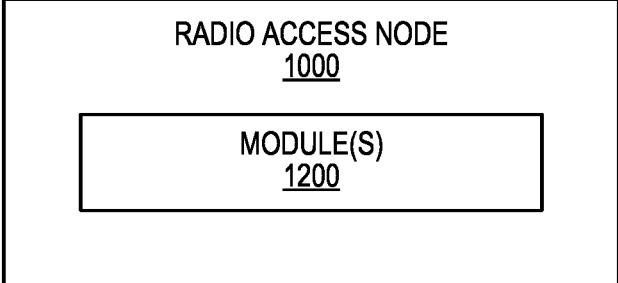
FIG. 12 is a schematic block diagram of the network node, according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
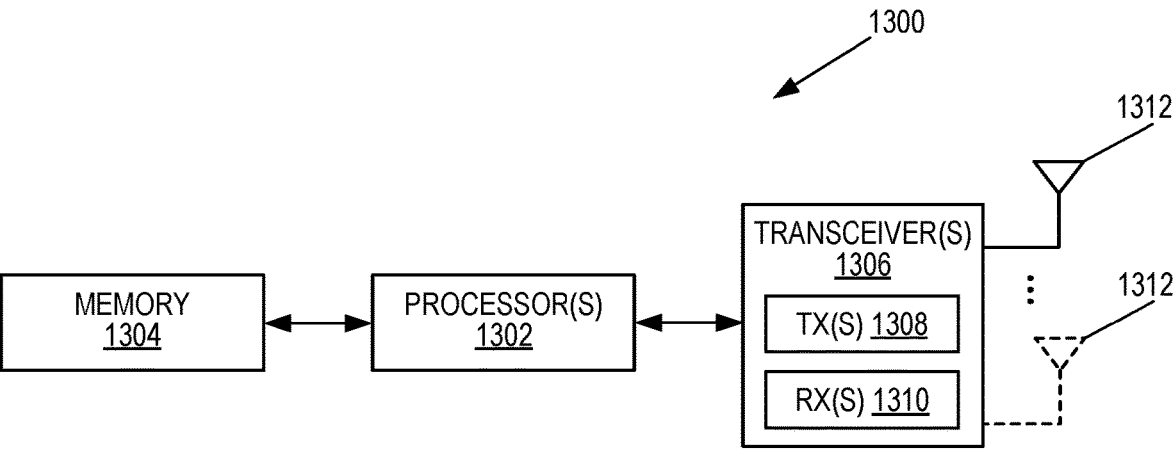
FIG. 13 is a schematic block diagram of a UE, according to some embodiments of the present disclosure.

FIG. 13 is a schematic block diagram of a wireless communication device 1300 according to some embodiments of the present disclosure. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
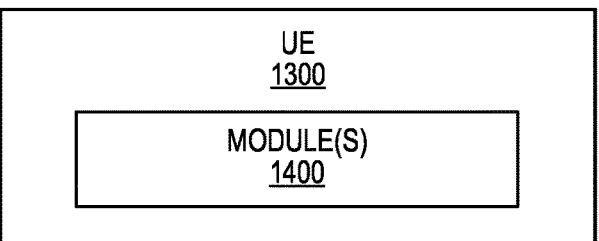
FIG. 14 is a schematic block diagram of the UE, according to some embodiments of the present disclosure.

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein.

Figure 15:
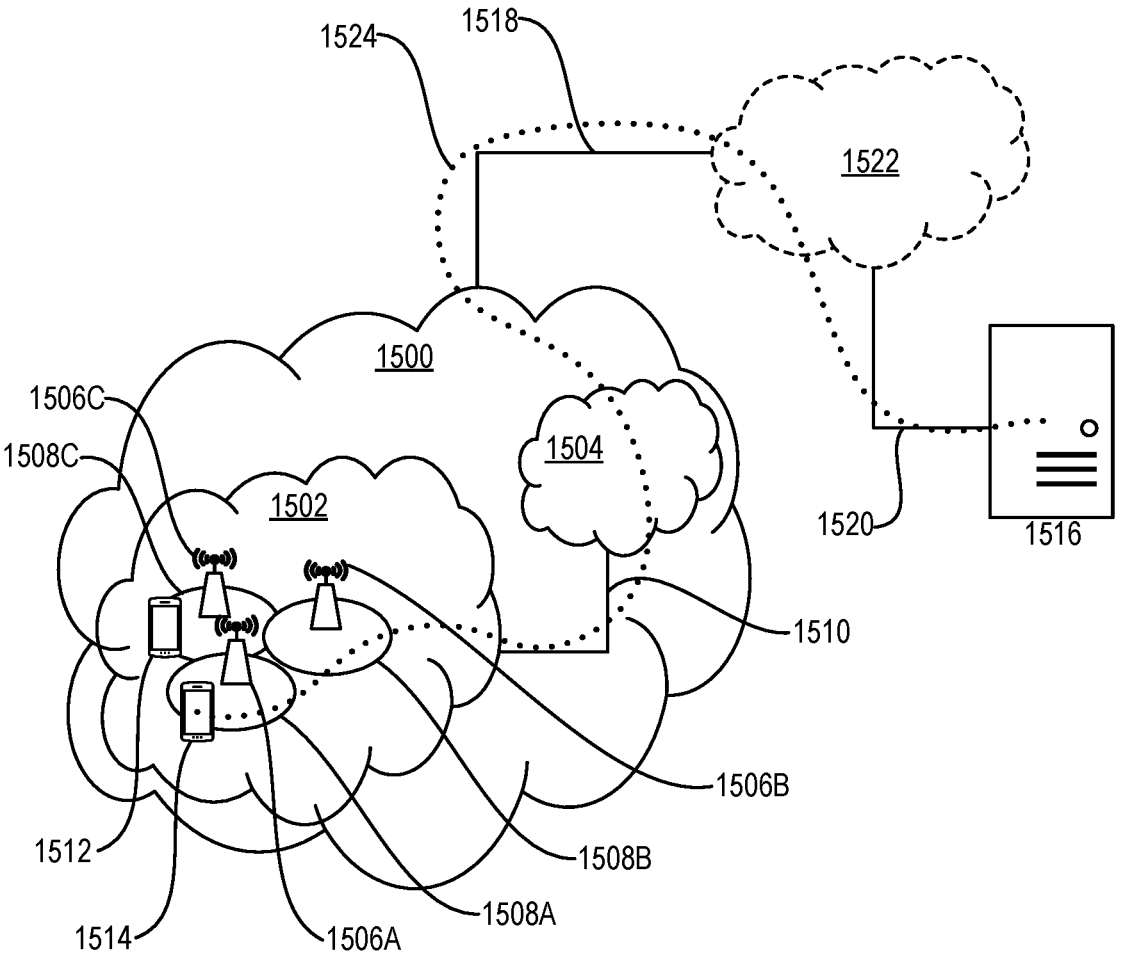
FIGS. 15 and 16 illustrate examples of a cellular communications system, according to some embodiments of the present disclosure.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as Node Bs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer 1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
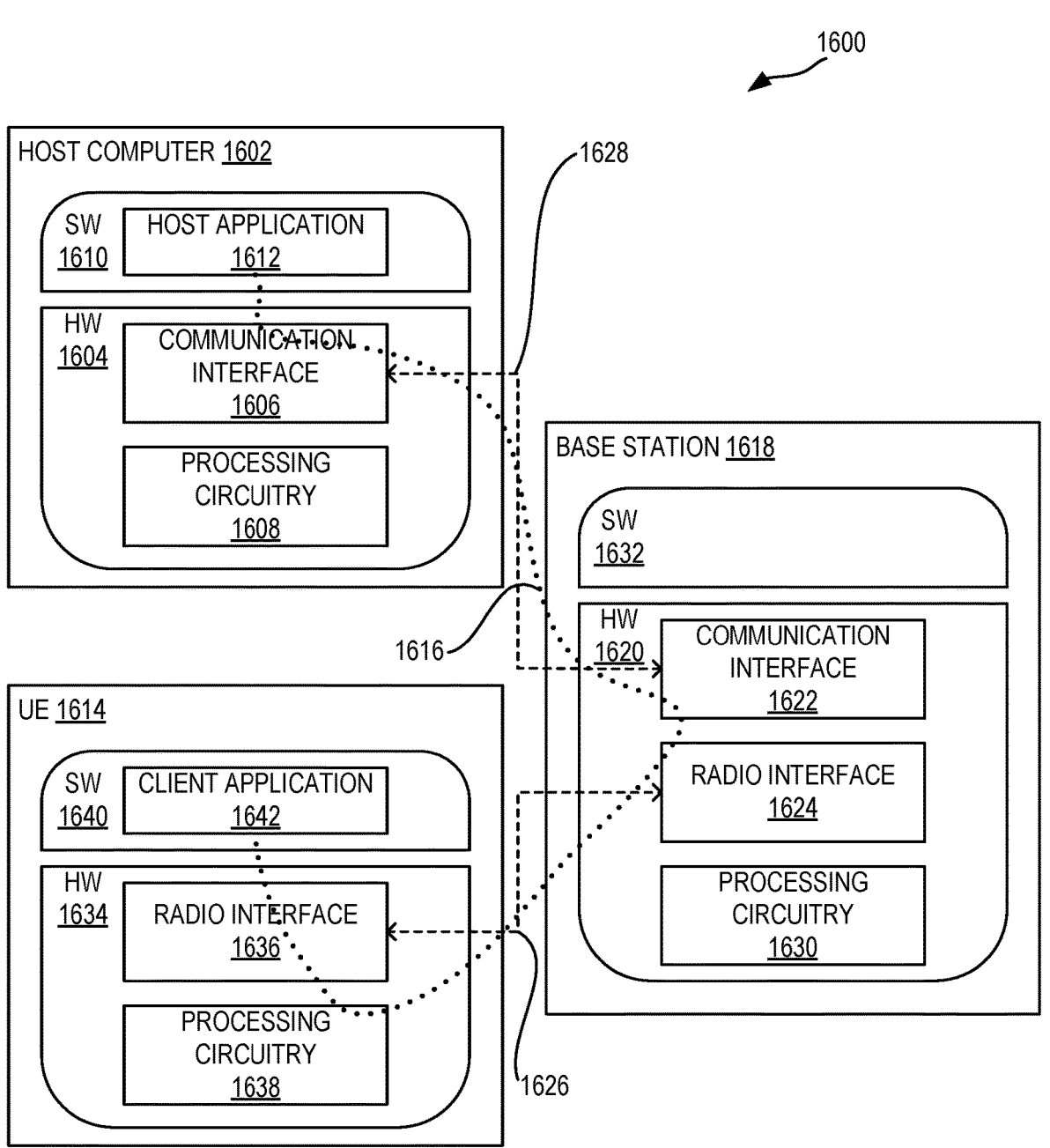

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

Figures 17, 18:
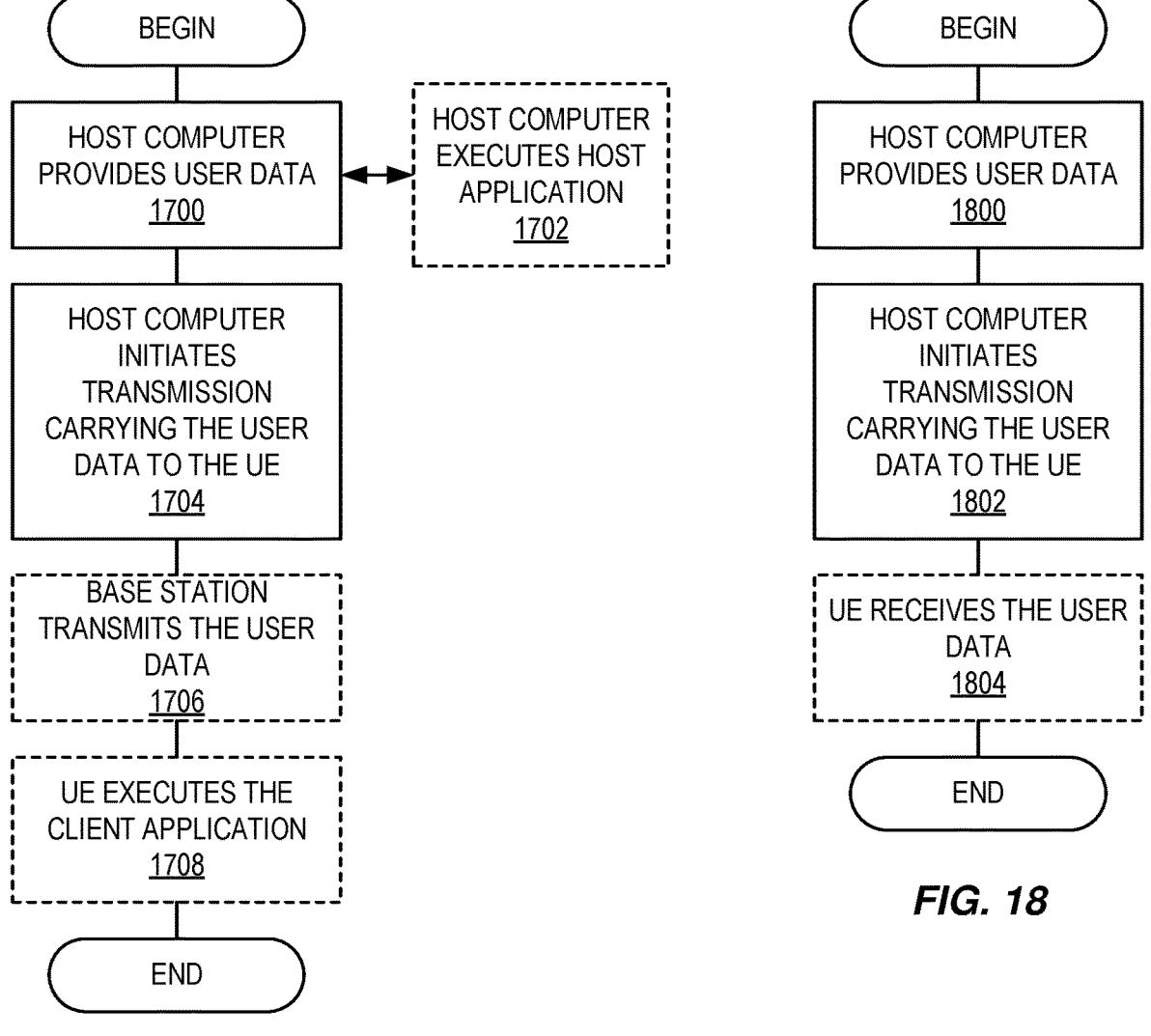
FIGS. 17, 18, 19, and 20 are flowcharts illustrating methods implemented in a communication system, according to some embodiments of the present disclosure.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

Figures 19, 20:
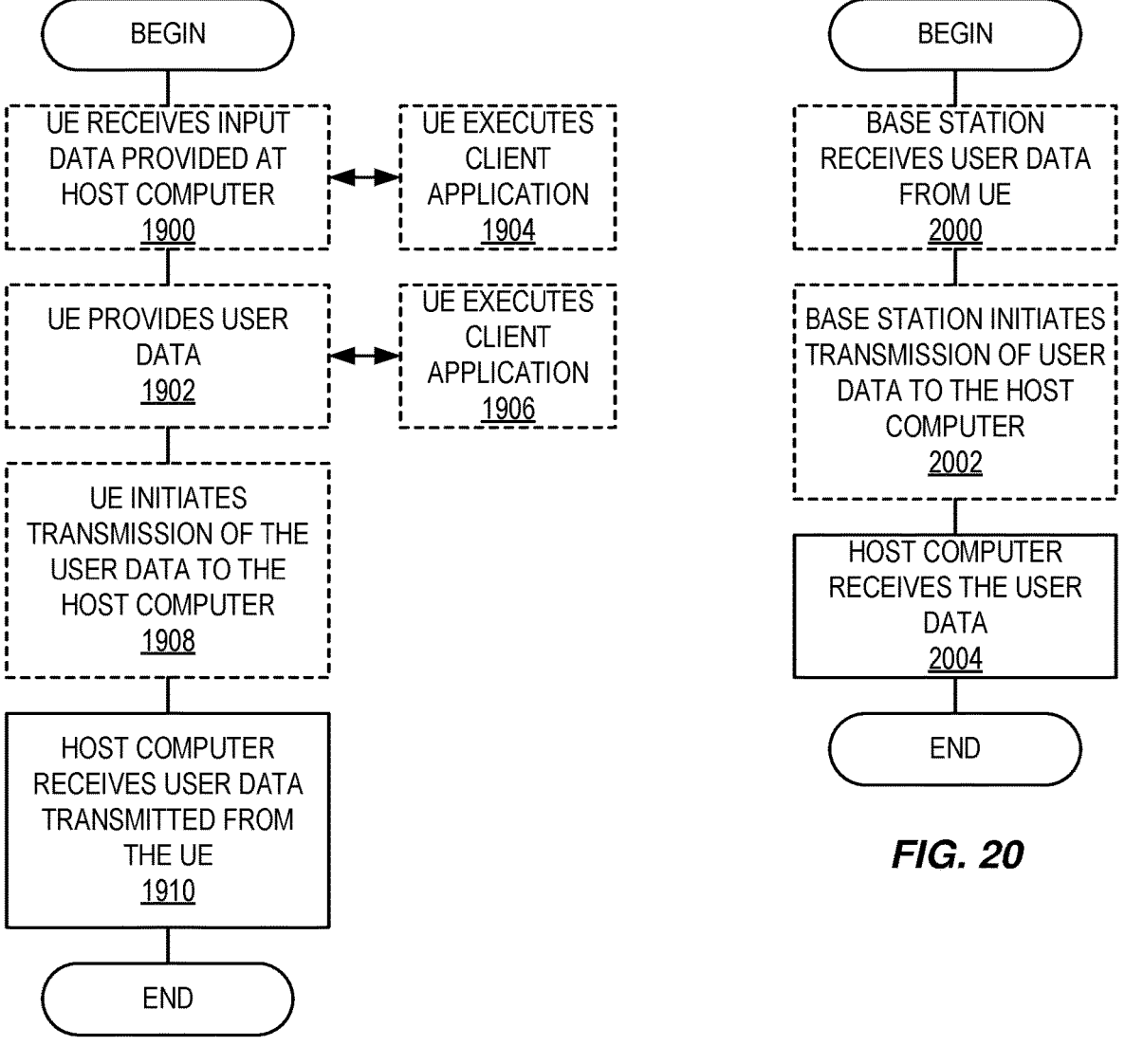

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1900 (which may be optional), the UE receives input data provided by the host computer. Additionally or alternatively, in step 1902, the UE provides user data. In sub-step 1904 (which may be optional) of step 1900, the UE provides the user data by executing a client application. In sub-step 1906 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1908 (which may be optional), transmission of the user data to the host computer. In step 1910 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2000 (which may be optional), in accordance with the teachings of the embodiments described throughout this disclosure, the base station receives user data from the UE. In step 2002 (which may be optional), the base station initiates transmission of the received user data to the host computer. In step 2004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

The following enumerated clauses describe some embodiments of the present disclosure. Aspects of the enumerated embodiments may be combined together in additional embodiments that are within the scope of the present disclosure.

EMBODIMENTS

Group A Embodiments

Embodiment 1: A method performed by a wireless device for monitoring uplink, UL, cancelation indications, the method comprising one or more of: determining (800) a time interval during which the wireless device should monitor UL cancelation indications; and monitoring (802) UL cancelation indications during the time interval.

Embodiment 2: The method of embodiment 1 wherein determining the time interval comprises determining the time interval during which the wireless device should monitor UL cancelation indication based on one or more of: a wireless device processing time; and a configuration of UL cancelation indications.

Embodiment 3: The method of embodiment 2 wherein the wireless device processing time relates to a time which the wireless device needs to process the UL cancelation indication.

Embodiment 4: The method of embodiment 3 wherein the time which the wireless device needs to process the UL cancelation indication comprises a time which the wireless device needs to decode the UL cancelation indication.

Embodiment 5: The method of any of embodiments 2 to 4 wherein the wireless device processing time is specified as a function of N2, where N2 is the time between the end of PDCCH scheduling PUSCH and the start of the scheduled PUSCH.

Embodiment 6: The method of any of embodiments 2 to 4 wherein the wireless device processing time is specified as a function of N1, where N1 is the time between the end of PDSCH and the start of the PUCCH carrying HARQ-ACK corresponding to the PDSCH.

Embodiment 7: The method of any of embodiments 2 to 6 wherein the wireless device processing time is specified as a function of N1 and N2.

Embodiment 8: The method of any of embodiments 2 to 7 wherein the wireless device processing time depends on one or more of: a wireless device processing capability; and Subcarrier Spacing, SCS.

Embodiment 9: The method of any of embodiments 1 to 8 wherein the time interval during which the wireless device should monitor UL cancelation indication only includes the monitoring occasions where, after processing the UL cancelation indication, it is possible to perform the indicated UL cancelation.

Embodiment 10: The method of embodiment 9 wherein the time interval during which the wireless device should monitor UL cancelation indication only includes the monitoring occasions where the gap between the end symbol of UL cancelation indication and the start of the UL transmission is larger than the wireless device processing time for UL cancelation indication.

Embodiment 11: The method of embodiment 9 wherein the time interval during which the wireless device should monitor UL cancelation indication only includes the monitoring occasions where the gap between the end symbol of UL cancelation indication and the end of the UL transmission is larger than the wireless device processing time for UL cancelation indication.

Embodiment 12: The method of any of embodiments 2 to 11 wherein the configuration of UL cancelation indications relates to a configuration of possible resources to which the cancelation indication can be applied.

Embodiment 13: The method of any of embodiments 2 to 12 wherein the configuration of UL cancelation indications only points to one or a limited number of the configured resources to indicate to the wireless device the resources over which the wireless device should cancel its UL transmissions.

Embodiment 14: The method of any of embodiments 1 to 13 wherein the time interval during which the wireless device should monitor UL cancelation indications only includes one or more monitoring occasions where it is possible for the UL cancelation indication, according to the configuration, to indicate one or more resources which overlap with at least one UL transmission of the wireless device.

Embodiment 15: The method of any of embodiments 1 to 14 wherein the time interval during which the wireless device should monitor UL cancelation indications refers to a start of the UL cancelation monitoring.

Embodiment 16: The method of any of embodiments 1 to 14 wherein the time interval during which the wireless device should monitor UL cancelation indications refers to an end of the UL cancelation monitoring.

Embodiment 17: The method of any of embodiments 1 to 16 wherein the time interval during which the wireless device should monitor UL cancelation indication only includes the monitoring occasions which occur after the end symbol of PDCCH scheduling PUSCH for dynamically scheduled PUSCH.

Embodiment 18: The method of embodiment 17 wherein the time interval during which the wireless device should monitor UL cancelation indication only includes the monitoring occasions which occur after M symbols after the end symbol of PDCCH scheduling PUSCH, where M is a function of the wireless device processing time for PDCCH.

Embodiment 19: The method of embodiment 18 wherein the wireless device processing time for PDCCH is specified as a function of N1, where N1 is a time between the end of PDSCH and the start of the PUCCH carrying HARQ-ACK corresponding to the PDSCH.

Embodiment 20: The method of embodiment 18 wherein the wireless device processing time for PDCCH is specified as a function of N2, where N2 is a time between the end of PDCCH scheduling PUSCH and the start of the scheduled PUSCH.

Embodiment 21: The method of any of embodiments 18 to 20 wherein the wireless device processing time for PDCCH is specified as a function of N1 and N2.

Embodiment 22: The method of any of embodiments 1 to 21 wherein the UL cancelation indication is for Ultra-Reliable and Low Latency Communication, URLLC.

Embodiment 23: The method of any of the previous embodiments, further comprising: providing user data; and forwarding the user data to a host computer via the transmission to the base station.

Group B Embodiments

Embodiment 24: A method performed by a base station for enabling monitoring of uplink, UL, cancelation indications, the method comprising: determining (900), a time interval during which a wireless device should monitor UL cancelation indications; and sending (904), to the wireless device, an UL cancelation indication.

Embodiment 25: The method of embodiment 24 further comprising: sending (902), to the wireless device, an indication of the time interval during which a wireless device should monitor UL cancelation indications.

Embodiment 26: The method of any of embodiments 24 to 25 further comprising any of the features in embodiments 1 to Embodiment 23:

Embodiment 27: The method of any of the previous embodiments, further comprising: obtaining user data; and forwarding the user data to a host computer or a wireless device.

Group C Embodiments

Embodiment 28: A wireless device for monitoring uplink, UL, cancelation indications, the wireless device comprising: processing circuitry configured to perform any of the steps of any of the Group A embodiments; and power supply circuitry configured to supply power to the wireless device.

Embodiment 29: A base station for enabling monitoring of uplink, UL, cancelation indications, the base station comprising: processing circuitry configured to perform any of the steps of any of the Group B embodiments; and power supply circuitry configured to supply power to the base station.

Embodiment 30: A User Equipment, UE, for monitoring uplink, UL, cancelation indications, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 31: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 32: The communication system of the previous embodiment further including the base station.

Embodiment 33: The communication system of the previous 2 embodiments, further including the UE, wherein the UE is configured to communicate with the base station.

Embodiment 34: The communication system of the previous 3 embodiments, wherein: the processing circuitry of the host computer is configured to execute a host application, thereby providing the user data; and the UE comprises processing circuitry configured to execute a client application associated with the host application.

Embodiment 35: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 36: The method of the previous embodiment, further comprising, at the base station, transmitting the user data.

Embodiment 37: The method of the previous 2 embodiments, wherein the user data is provided at the host computer by executing a host application, the method further comprising, at the UE, executing a client application associated with the host application.

Embodiment 38: A User Equipment, UE, configured to communicate with a base station, the UE comprising a radio interface and processing circuitry configured to perform the method of the previous 3 embodiments.

Embodiment 39: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 40: The communication system of the previous embodiment, wherein the cellular network further includes a base station configured to communicate with the UE.

Embodiment 41: The communication system of the previous 2 embodiments, wherein: the processing circuitry of the host computer is configured to execute a host application, thereby providing the user data; and the UE's processing circuitry is configured to execute a client application associated with the host application.

Embodiment 42: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 43: The method of the previous embodiment, further comprising at the UE, receiving the user data from the base station.

Embodiment 44: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 45: The communication system of the previous embodiment, further including the UE.

Embodiment 46: The communication system of the previous 2 embodiments, further including the base station, wherein the base station comprises a radio interface configured to communicate with the UE and a communication interface configured to forward to the host computer the user data carried by a transmission from the UE to the base station.

Embodiment 47: The communication system of the previous 3 embodiments, wherein: the processing circuitry of the host computer is configured to execute a host application; and the UE's processing circuitry is configured to execute a client application associated with the host application, thereby providing the user data.

Embodiment 48: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 49: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 50: The method of the previous embodiment, further comprising, at the UE, providing the user data to the base station.

Embodiment 51: The method of the previous 2 embodiments, further comprising: at the UE, executing a client application, thereby providing the user data to be transmitted; and at the host computer, executing a host application associated with the client application.

Embodiment 52: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 53: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 54: The communication system of the previous embodiment further including the base station.

Embodiment 55: The communication system of the previous 2 embodiments, further including the UE, wherein the UE is configured to communicate with the base station.

Embodiment 56: The communication system of the previous 3 embodiments, wherein: the processing circuitry of the host computer is configured to execute a host application; and the UE is configured to execute a client application associated with the host application, thereby providing the user data to be received by the host computer.

Embodiment 57: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 58: The method of the previous embodiment, further comprising at the base station, receiving the user data from the UE.

Embodiment 59: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Function
AN Access Network
AP Access Point
ASIC Application Specific Integrated Circuit
AUSF Authentication Server Function
CI Cancelation Indication
CPU Central Processing Unit
DSP Digital Signal Processor
eMBB Enhanced Mobile Broadband
eNB Enhanced or Evolved Node B
EPC Evolved Packet Core
EPS Evolved Packet System
E-UTRA Evolved Universal Terrestrial Radio Access
FPGA Field Programmable Gate Array
gNB New Radio Base Station
gNB-CU New Radio Base Station Central Unit
gNB-DU New Radio Base Station Distributed Unit
HARQ-ACK Hybrid Automatic Repeat Request Acknowledgement
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OFDM Orthogonal Frequency Division Multiplexing
OTT Over-the-Top
PC Personal Computer
PCF Policy Control Function
PDCCH Physical Downlink Control Channel
PDSCH Physical Downlink Shared Channel
P-GW Packet Data Network Gateway
PI Preemption Indication
PRACH Physical Random Access Channel
PSD Power Spectral Density
PUCCH Physical Uplink Control Channel
PUSCH Physical Uplink Shared Channel
RAM Random Access Memory
RAN Radio Access Network
ROM Read Only Memory
RRH Remote Radio Head
SCEF Service Capability Exposure Function
SCS Subcarrier Spacing

24

SINR Signal to Interference Plus Noise Ratio
SMF Session Management Function
UDM Unified Data Management
UE User Equipment
UL Uplink
UPF User Plane Function
URLLC Ultra-Reliable Low Latency Communication Those skilled in the art will recognize improvements and modifications to the embodiments of the present disclosure. All such improvements and modifications are considered within the scope of the concepts disclosed herein.

What is claimed is:

1. A method performed by a wireless device for monitoring uplink, UL, cancelation indications, the method comprising:

determining a time interval during which the wireless device should monitor the UL cancelation indications, wherein the time interval comprises a shortened time interval of an interval between receiving an uplink grant scheduling an uplink transmission and a scheduled time for the uplink transmission that comprises one or more UL cancellation indication monitoring occasions, and wherein determining the time interval comprises determining the time interval during which the wireless device should monitor the UL cancelation indications based on a configuration of each of the UL cancelation indications, wherein the configuration of the UL cancelation indication relates to a configuration of possible uplink time/frequency radio resources to which the cancelation indication is applicable, and the UL cancellation indication monitoring occasion is only included in the time interval if the possible uplink time/frequency radio resources configured for the UL cancellation indication overlap with the scheduled time for the uplink transmission; and monitoring the UL cancelation indications during the time interval.

2. The method of claim 1, wherein determining the time interval further comprises determining the time interval during which the wireless device should monitor the UL cancelation indication based on a wireless device processing time, wherein the wireless device processing time relates to a time which the wireless device needs to process the UL cancelation indication.

3. The method of claim 2 wherein the time which the wireless device needs to process the UL cancelation indication comprises: a time which the wireless device needs to decode the UL cancelation indication.

4. The method of claim 2, wherein the wireless device processing time is specified as a function of N2, where N2 is a time between the end of a Physical Downlink Control Channel, PDCCH, scheduling a Physical Uplink Shared Channel, PUSCH, and a start of the scheduled PUSCH.

5. The method of claim 2, wherein the wireless device processing time is specified as a function of N1, where N1 is a time between an end of a Physical Downlink Shared Channel, PDSCH, and a start of a Physical Uplink Control Channel, PUCCH, carrying a Hybrid Automatic Repeat Request Acknowledgement, HARQ-ACK, corresponding to the PDSCH.

6. The method of claim 2, wherein the wireless device processing time is specified as a function of N1 and N2.

7. The method of claim 2, wherein the wireless device processing time depends on one or more of: a wireless device processing capability; and Subcarrier Spacing, SCS.

8. The method of claim 1 wherein the time interval during which the wireless device should monitor the UL cancelation indication only includes monitoring occasions where either a gap between an end symbol of the UL cancelation indication and a start of a UL transmission is larger than the wireless device processing time for the UL cancelation indication or a gap between an end symbol of the UL cancelation indication and an end of the UL transmission is larger than the wireless device processing time for the UL cancelation indication.

9. The method of claim 1, wherein the configuration of the UL cancelation indications only points to one or a limited number of the configured resources to indicate to the wireless device the resources over which the wireless device should cancel the UL transmissions.

10. The method of claim 1 wherein the time interval during which the wireless device should monitor the UL cancelation indications refers to a start of the UL cancelation monitoring or to an end of the UL cancelation monitoring.

11. The method of claim 1, wherein the time interval during which the wireless device should monitor the UL cancelation indication only includes the monitoring occasions that occur after an end symbol of a physical downlink control channel (PDCCH) scheduling a physical uplink shared channel (PUSCH) for a dynamically scheduled PUSCH.

12. The method of claim 11, wherein the time interval during which the wireless device should monitor the UL cancelation indication only includes the monitoring occasions that occur after M symbols after the end symbol of the PDCCH scheduling the PUSCH, where M is a function of the wireless device processing time for the PDCCH.

13. The method of claim 12, wherein the wireless device processing time for the PDCCH is either specified as a function of N1, where N1 is a time between an end of the PDSCH and a start of a physical uplink control channel (PUCCH) carrying a hybrid automatic repeat request (HARQ) acknowledgement (ACK) corresponding to the PDSCH, or specified as a function of N2, where N2 is a time between the end of the PDCCH scheduling the PUSCH and the start of the scheduled PUSCH and the wireless device processing time for the PDCCH is specified as the function of N1 and N2.

14. The method of claim 1 wherein the UL cancelation indication is for Ultra-Reliable and Low Latency Communication, URLLC and/or a New Radio, NR, communications network.

15. A wireless device for validating one or more parameters, the wireless device comprising:

one or more processors; and memory storing instructions executable by the one or more processors, whereby the wireless device is operable to:

determine a time interval during which the wireless device should monitor UL cancelation indications, wherein the time interval comprises a shortened time interval of an interval between receiving an uplink grant scheduling an uplink transmission and a scheduled time for the uplink transmission that comprises one or more UL cancellation indication monitoring occasions, and wherein determining the time interval comprises determining the time interval during which the wireless device should monitor the UL cancelation indications based on a configuration of each of the UL cancelation indications, wherein the configuration of the UL cancelation indication relates to a configuration of possible uplink time/frequency radio resources to which the cancelation indication is applicable, and the UL cancellation indication monitoring occasion is only included in the time interval if the possible uplink time/frequency radio resources configured for the UL cancellation indication overlap with the scheduled time for the uplink transmission; and monitor the UL cancelation indications during the time interval.

\* \* \* \* \*